(12) United States Patent
El-Naas

(10) Patent No.: US 9,724,639 B2
(45) Date of Patent: Aug. 8, 2017

(54) SYSTEM FOR CONTACTING GASES AND LIQUIDS

(71) Applicants: UNITED ARAB EMIRATES UNIVERSITY, Al-Ain (AE); ABU DHABI OIL REFINING COMPANY (TAKREER), Abu Dhabi (AE)

(72) Inventor: Muftah El-Naas, Al-Ain (AE)

(73) Assignees: UNITED ARAB EMIRATES UNIVERSITY, Al-Ain (AE); ABU DHABI OIL REFINING COMPANY (TAKREER), Abu Dhabi (AE)

( * ) Notice: Subject to any disclaimer, the term of this patent is extended or adjusted under 35 U.S.C. 154(b) by 0 days.

(21) Appl. No.: 14/829,419

(22) Filed: Aug. 18, 2015

(65) Prior Publication Data
US 2017/0050142 A1    Feb. 23, 2017

(51) Int. Cl.
| B01F 3/04 | (2006.01) |
| B01D 53/18 | (2006.01) |
| B01J 8/22 | (2006.01) |
| B01D 53/14 | (2006.01) |

(52) U.S. Cl.
CPC ......... *B01D 53/18* (2013.01); *B01D 53/1475* (2013.01); *B01F 3/04468* (2013.01); *B01F 3/04496* (2013.01); *B01J 8/22* (2013.01); *B01J 8/226* (2013.01); *B01D 2252/1035* (2013.01); *B01F 2215/008* (2013.01); *B01J 2208/0061* (2013.01); *B01J 2208/00212* (2013.01); *B01J 2208/00902* (2013.01)

(58) Field of Classification Search
CPC ........ B01F 3/022; B01F 5/24; B01F 13/0011; B01F 13/0052; B01F 3/04468; B01F 3/04496; B01F 2215/008; B01D 53/1475; B01D 53/18; B01D 2252/1035; B01J 8/22; B01J 8/226; B01J 2208/00212; B01J 2208/0061; B01J 2208/00902
USPC .......... 261/95, 96, 121.1; 366/101, 103, 104
See application file for complete search history.

(56) References Cited

U.S. PATENT DOCUMENTS

| 685,810 | A | * | 11/1901 | Worns | .................... | B01D 35/04 |
| | | | | | | 137/544 |
| 1,138,202 | A | * | 5/1915 | Erlwein et al. | ..... | B01F 3/04801 |
| | | | | | | 127/12 |
| 2,015,347 | A | * | 9/1935 | Luther | .................... | B01J 10/00 |
| | | | | | | 196/106 |

(Continued)

FOREIGN PATENT DOCUMENTS

| CN | 201482399 | 5/2010 |
| CN | 101991995 | 3/2011 |

(Continued)

OTHER PUBLICATIONS

Chang et al., "Mass transfer in two-and three-phase fluidized beds," J Chem Eng Japan, 1986, pp. 524-530, vol. 19, No. 6, The Society of Chemical Engineers, Japan, Tokyo.

(Continued)

*Primary Examiner* — Charles Bushey
*Assistant Examiner* — Scott Bushey
(74) *Attorney, Agent, or Firm* — Christopher J. McKenna; Foley & Lardner LLP

(57) ABSTRACT

A system for contacting gases and liquids includes a vessel containing inert particles, wherein the total volume of the inert particles is from 1 to 20% of the total working volume of the vessel.

7 Claims, 4 Drawing Sheets

(56) References Cited

U.S. PATENT DOCUMENTS

| | | | | |
|---|---|---|---|---|
| 3,219,324 | A | * | 11/1965 | Williams ............ B01F 3/04468 261/95 |
| 3,350,075 | A | * | 10/1967 | Douglas ................ B01D 47/00 261/95 |
| 3,733,061 | A | * | 5/1973 | Bockman ................ B01J 8/226 261/21 |
| 3,801,474 | A | * | 4/1974 | Castellucci et al. . B01D 5/0066 159/903 |
| 3,809,240 | A | * | 5/1974 | Savall ................ B03D 1/1431 210/221.2 |
| 3,905,900 | A | * | 9/1975 | Gulyas .................. B08B 9/057 210/718 |
| 4,130,356 | A | | 12/1978 | Yamanaka |
| 4,130,365 | A | | 12/1978 | Sittig |
| 4,168,913 | A | * | 9/1979 | Kono ................ B01F 13/0205 366/101 |
| 4,533,367 | A | * | 8/1985 | Hadzismajlovic ..... B01D 47/14 261/96 |
| 5,928,620 | A | | 7/1999 | Lynn |
| 6,123,324 | A | | 9/2000 | Swan et al. |
| 6,631,890 | B1 | * | 10/2003 | Lau ........................ B01J 19/30 261/94 |
| 7,637,485 | B2 | * | 12/2009 | Honnell .................. B01J 19/30 261/95 |
| 7,931,809 | B2 | | 4/2011 | Constantz et al. |
| 2010/0150803 | A1 | | 6/2010 | Lin |
| 2010/0154679 | A1 | | 6/2010 | Constantz et al. |
| 2011/0064634 | A1 | | 3/2011 | Enos et al. |
| 2011/0168059 | A1 | | 7/2011 | Murray et al. |
| 2015/0191385 | A1 | | 7/2015 | Lee et al. |

FOREIGN PATENT DOCUMENTS

| | | |
|---|---|---|
| CN | 101875000 A | 7/2012 |
| CN | 103861444 | 10/2015 |
| EP | 1 217 061 A1 | 6/2002 |
| FR | 2998811 | 6/2014 |
| GB | 2 027 607 | 2/1980 |
| WO | WO-2007/139392 A1 | 12/2007 |
| WO | WO-2011/102868 | 8/2011 |
| WO | WO-2012/085552 | 6/2012 |
| WO | WO-2012/113958 A1 | 8/2012 |
| WO | WO-2014/177857 | 11/2014 |

OTHER PUBLICATIONS

International Search Report and Written Opinion for PCT/GB2016/052560 dated Nov. 8, 2016.
International Search Report and Written Opinion for PCT/GB2016/052561 dated Jan. 2, 2017.

* cited by examiner

SYSTEM FOR CONTACTING GASES AND LIQUIDS

FIELD OF THE INVENTION

This invention relates to a system for contacting gases and liquids, which may be suitable for many applications involving gas-liquid contact or gas-liquid reactions.

BACKGROUND OF THE INVENTION

Gas-liquid contactors are widely used in many industries such as chemical, biochemical, petrochemical and metallurgical industries. The selection, design, sizing and performance of these contactors or reactors often depend on the mass and heat transfer, hydrodynamics, and reaction kinetics. These units are commonly encountered as aerators or gas-liquid reactors, where the gas first dissolves in the liquid and then reacts with the liquid or any materials dissolved in the liquid. The reactions in such reactors are often classified into slow and fast regimes (Advances in Chemical Engineering, Academic Press 1981, pp. 1-133). For slow reactions, high liquid holdup and mass transfer are needed to maintain the gas concentration in the bulk close to the saturation, while for fast reactions, high gas holdup and small bubble size are required since the gas concentration in the liquid bulk is almost zero and the gas-liquid interfacial area controls the rate of gas absorption (Advances in Chemical Engineering, Academic Press 1981, pp. 1-133). By increasing the contact surface area between the gas and the liquid, faster chemical or biochemical reaction rates will be achieved and correspondingly higher mass transfer rates.

One major drawback of some high performance gas-liquid contactors that involve good mixing is the need for high mechanical energy. However, such mechanical energy may be utilized more efficiently in some types of gas-liquid contactors than others. The mass transfer performance of different gas-liquid contactors under the same operating conditions may thus vary significantly (Chemical Engineering and Processing: Process Intensification, 38 (1999) 503-510). Bubble column reactors, spouted bed rectors, packed columns and agitated reactors with high liquid holdup are suitable for slow-reaction processes such as liquid-phase oxidations, hydrogenations, chlorination and some fermentation (Advances in Chemical Engineering, Academic Press 1981, pp. 1-133). Plate, packed columns and venturi-type reactors are more suitable for fast reaction processes due to the high gas-liquid interfacial area (Chemical Engineering Science, 48 (1993) 889-911); however, under specific conditions, bubble column reactors and packed column reactors are suitable for highly exothermic fast reaction processes, which are widely used in the chemical, biochemical, petrochemical and metallurgical applications (Chemical Engineering Science, 48 (1993) 889-911).

Gas-liquid contactors may be classified into surface and volume contactors. They may also be sorted based on the level of mass transfer rate inside the apparatus. Contactors with low mechanical energy consumption have in general low mass transfer rates and low performance. More mechanical energy consumption, which is usually associated with more mixing, inside a gas-liquid contactor improves the mass transfer rate. Such gas-liquid contactors are called high performance contactors and they become important with increasing demand for high gas absorption rates and for small volumes of the installed equipment (Chemical Engineering and Processing: Process Intensification, 38 (1999) 503-510).

Surface gas-liquid contactors are typically used for biological wastewater treatment and usually have the form of pools with moderately low depth. They often involve the use of impellers or liquid jets to create the required gas-liquid interfacial area (Chemical Engineering and Processing: Process Intensification, 38 (1999) 503-510). On the other hand, in volume gas-liquid contactors, the interfacial area between the gas and liquid phases is created within the bulk of the liquid. The gas phase is dispersed in the form of bubbles with spherical or irregular shape. Gas dispersion in the liquid is usually achieved through the use of spargers, liquid jets, two-mixture nozzles or hollow rotating mixers (Chemical Engineering and Processing: Process Intensification, 38 (1999) 503-510). Examples of common gas-liquid contactors/reactors include bubble column reactors, stirred vessel reactors, jet loop reactors, reciprocating jet reactors, and impinging-stream reactors. A bubble column reactor is a vessel in which a sparger is placed at the bottom and it is characterized by relatively low mass transfer performance.

Bubble columns are generally used in the bio-processing industry to perform a range of aerobic fermentations due to their mechanical simplicity, low capital cost, and good heat and mass transfer characteristics (Chemical Engineering Journal, 264 (2015) 291-301). The volumetric mass transfer coefficient value in a bubble column depends on the physical properties of the fluids used, the gas flow rate (Chemical Engineering and Processing: Process Intensification, 38 (1999) 503-510), sparger design (Chemical Engineering and Processing: Process Intensification, 38 (1999) 329-344), reactor length to diameter ratio (H/D) (Chemical Engineering Science, 25 (1970) 340-341), system pressure (Chemical Engineering Science, 52 (1997) 4447-4459), and temperature (Chemical Engineering Science, 56 (2001) 6241-6247). The bubble size inside the bubble column approaches a stable size shortly after dispersion. Under such conditions, the mass transfer performance becomes less sensitive to the design of the sparger (Chemical Engineering Science, 48 (1993) 889-911).

The advantages of bubble column rectors are: low maintenance and operating cost, low capital, excellent heat transfer and temperature control, high gas-liquid interfacial area and volumetric mass transfer coefficient at low energy input and high liquid volume and residence time due to the reactor geometry and height to diameter ratio. These reactors do, however, suffer from some drawbacks such as back-mixing and bubble-bubble interactions in the churn-turbulent flow regime; difficult catalyst and liquid separation, particularly for highly viscous slurries containing fine particles; and complex scale-up due to the lack of knowledge on the hydrodynamics and mass transfer characteristics under typical industrial conditions (Fuel Processing Technology, 89 (2008) 322-343).

A stirred vessel reactor is usually a cylindrical vessel equipped with an impeller at its center. A sparger is placed under the impeller to enhance mixing and mass transfer through introducing small gas bubbles with a high surface area per unit volume and through increasing the level of turbulence in the liquid (Chemical Engineering Science, 92, (2014) 2191-2200). A jet loop reactor, on the other hand, is a vessel fitted with a two-mixture nozzle and a draft tube. The nozzle may be fixed at the top or at the bottom of the reactor and the draft tube may be either concentric with the main tube or next to it. The liquid jet at the nozzle outlet makes gas dispersion with very small size bubbles. The liquid momentum leads to circulation of the gas-liquid mixture, which leads to good mixing in these type of reactors with no dead zones (Chinese Chemical Engineering, 22 (2014) 611-621).

The reciprocating jet reactor consists of a number of perforated discs connected together with a central shaft. The discs and the shaft are placed in a cylindrical vessel and receive a counter motion with high amplitude and a frequency, causing the mixture to flow through the holes of the discs in the form of jets (Chemical Engineering and Processing: Process Intensification, 38 (1999) 503-510). Gas and liquid are fed to the reactor through nozzles placed at the inlet of guide tubes. A homogeneous two-phase stream is formed. The gas phase is dispersed and the kinetic energy of the two-phase streams is dissipated. This creates a high turbulence and a large mass transfer area between the gas and the liquid phase (Chemical Engineering Science, 47, (1992) 2877-2882).

Although the above-mentioned gas-liquid contactors have been widely used in many industries, none of them can be applied to a variety of unit operations with the same efficiency, and they all suffer from different drawbacks such as complexity, high demand for mechanical energy and difficulty to scale-up. The current invention describes a simple system that can provide excellent gas-liquid contact, high performance efficiency and can be easily scaled-up.

SUMMARY OF THE INVENTION

The present invention provides a system for contacting gases and liquids, comprising a vessel containing inert particles, wherein the total volume of the inert particles is from 1 to 20% of the total working volume of the vessel.

The total volume of the inert particles is preferably from 3 to 15% of the total working volume of the vessel, optionally from 5 to 10% of the total working volume of the vessel.

The system preferably further comprises a single orifice typically located at the base of the vessel configured to allow gas to pass into the vessel, and a gas outlet optionally located above the surface of the working volume while in use, configured to allow gas to pass out of the vessel. The single orifice is optionally located centrally at the base of the vessel such that gas can be introduced centrally into the vessel.

The system preferably further comprises a liquid inlet configured to allow liquid to pass into the vessel and a liquid outlet configured to allow liquid to leave the vessel, wherein the liquid inlet, the liquid outlet, the gas inlet and the gas outlet are optionally arranged such that the liquid passes the gas in counter-current flow through at least a portion of the vessel while in use.

The liquid outlet optionally comprises an effluent passage extending into the vessel, optionally extending to the bottom of the vessel. The inlet of the effluent passage is preferably located below the liquid inlet so that the liquid leaves the vessel via the effluent passage due to the hydrostatic pressure of the liquid in the vessel while in use.

The system typically comprises a liquid provided in the vessel, wherein the density of the inert particles is preferably 15% or less above or below the density of the liquid, optionally 10% or less above or below the density of the liquid, optionally 5% or less above or below the density of the liquid.

The inert particles are preferably spherical and preferably have a particle size (diameter) of from 1 mm to 25 mm, optionally of from 3 to 20 mm, optionally of from 5 to 15 mm. For non-spherical particles, each of the particles preferably has a volume corresponding to an equivalent spherical diameter $d_v$ $$\left(\text{i.e. } d_v = 2\sqrt[3]{\frac{3V}{4\pi}}, \text{ where } V \text{ is the volume of the non-spherical particle}\right).$$

The base of the vessel optionally has a conical shape.

The introduction of a gas into the vessel preferably causes the inert particles to follow a circular or elliptical path within the vessel, to produce mixing between the gas and the liquid.

BRIEF DESCRIPTION OF THE FIGURES

The invention will now be described, by way of example only, with reference to the accompanying figures, in which.

DETAILED DESCRIPTION OF THE INVENTION

The present invention identifies that the use of inert particles can enhance mixing within a gas-liquid contactor/reactor system and provide a high gas-liquid interfacial area for effective mass transfer.

Figure 1:
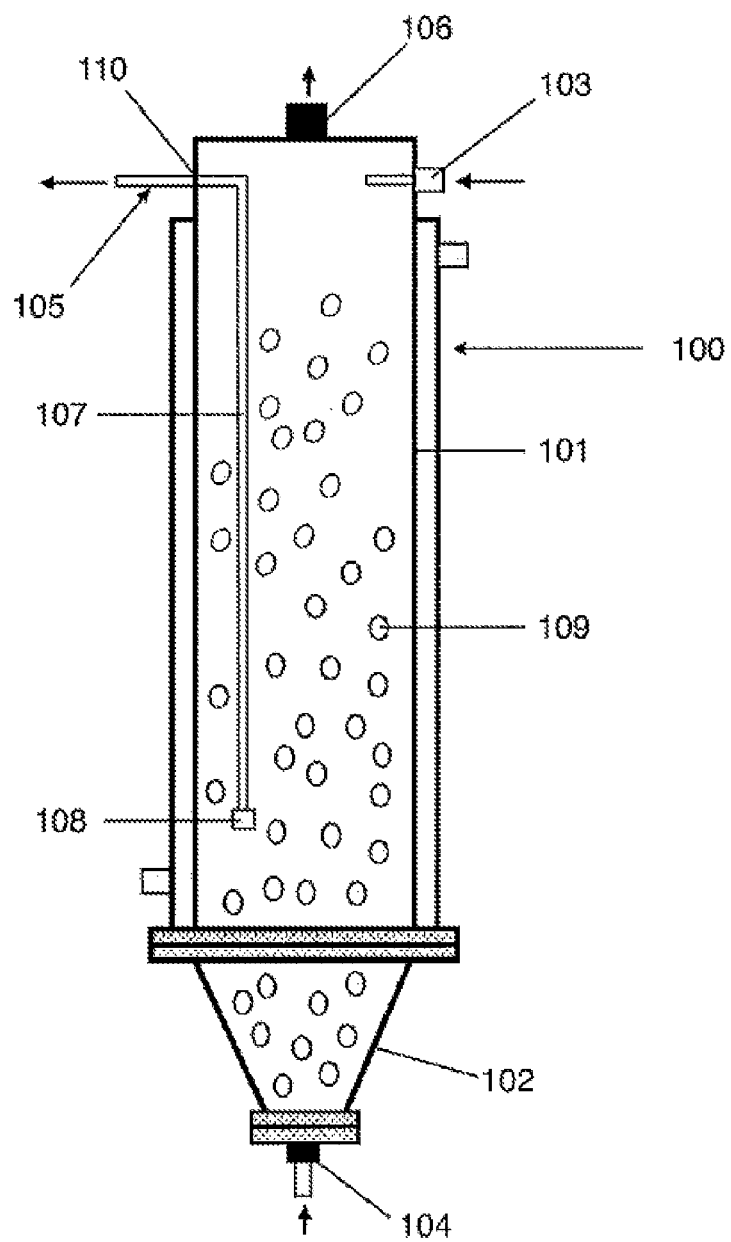
FIG. 1 shows a schematic view of a system for contacting gases and liquids in accordance with the invention.

FIG. 1 depicts an example of a system for contacting gases and liquids in accordance with the invention. The system comprises a vessel 100 having a cylindrical body 101. The vessel 100 has a base 102, which is attached to one end of the cylindrical body 101. The other end of the cylindrical body 101 is closed, but may be open to the atmosphere, depending on the specific use of the system. A temperature control jacket for controlling the temperature of the vessel 100 optionally surrounds the vessel 100.

In the arrangement shown in FIG. 1, the vessel is orientated vertically when in use, with the base 102 located at the bottom of the vessel 100 when viewing the vessel 100 from the front.

Liquid is fed into the vessel through a liquid inlet 103. The liquid inlet 103 is depicted toward the top of the vessel in FIG. 1; however, its location is not limited, but is preferably above the maximum working level of the liquid when the vessel 100 is in use.

Gas is fed into the vessel though a gas inlet 104. The gas inlet 104 is provided as a single orifice located at the bottom of the base 102 in FIG. 1 but in other embodiments, multiple orifices may be used. The size of the orifice(s), the gas velocity, as well as the gas to liquid ratio depend on the type of gas contact or the reaction system. The gas may be injected into the vessel as a jet using a nozzle (not shown in FIG. 1).

Liquid leaves the vessel 100 via a liquid outlet 105. The outlet can comprise an effluent passage 107 extending into the vessel from vessel exit point 110. The vessel exit point 110 (the point at which the liquid crosses the outer boundary of the vessel 100) is preferably located at approximately the same height as the liquid inlet 103. If the liquid leaves the vessel due to hydrostatic pressure, then the exit point 110 is located below the working level of the liquid. If the liquid leaves the vessel with the use of a pump, then the exit point 110 can be located at any position on the vessel 100.

Gas leaves the vessel 100 via a gas outlet 106. The gas outlet 106 is depicted on the top surface of the vessel 100 in FIG. 1; however, its location is not limited, but is preferably located above the working level of the liquid when the vessel 100 is in use.

The liquid inlet 103, the liquid outlet 105, the gas inlet 104 and the gas outlet 106 are preferably arranged such that the liquid passes the gas in counter-current flow through at least a portion of the vessel 100 while in use, for improved gas-liquid contact. For example, if the gas inlet 104 and the gas outlet 106 are arranged such that the gas is introduced at the bottom of the vessel and leaves at the top, then the liquid inlet 103 and liquid outlet 105 are preferably arranged such that the liquid flows in a downward direction past the gas through at least a portion of the vessel 100 while in use.

The above-described counter-current flow between the gas and liquid is preferably achieved with the provision of an effluent passage 107 extending from the exit point 110 into the vessel 100, as shown in FIG. 1. The effluent passage 107 directs the flow of liquid from a point inside the vessel 100 to the exit point 110 and could take the form of a tube or pipe, for example.

The inlet 108 to the effluent passage 107 is preferably located at a level below the liquid inlet 103 and is preferably located within the bottom 30% of the vessel (i.e. the bottom 30% of the distance between the top of the base 102 and the working level of the liquid), more preferably within the bottom 20% of the vessel and even more preferably within the bottom 10% of the vessel. This arrangement creates counter-current flow, as the gas flows upwards through the vessel 100 while the liquid flows downwards in order to exit the vessel via the inlet 108 to the effluent passage 107. Preferably, once the liquid effluent enters the effluent passage 107, the hydrostatic pressure of the liquid in the vessel 100 while in use causes the liquid effluent to flow through the effluent passage 107.

The provision and arrangement of the effluent passage 107 also reduces the entrainment of gas bubbles in the liquid effluent. This is because the resistance that gas bubbles face at the effluent passage inlet 108 are much higher than the resistance throughout the rest of the interior of the vessel 100.

The effluent passage inlet 108 is preferably provided with a filter for blocking solid particles from entering the liquid effluent passage 107.

The system further comprises inert particles 109, which are provided inside the vessel 100 when in use. The total volume of the inert particles 109 is from 1 to 20% of the total working volume of the vessel 100 (i.e. the volume of liquid in the vessel during operation), preferably from 3 to 15% of the total working volume of the vessel 100 and more preferably from 5 to 10% of the total working volume of the vessel 100.

The inert particles 109 are preferably inert with respect to the gas-liquid system and should not react when contacting any of the liquids or gases within the vessel 100. Furthermore, the inert particles 109 preferably do not act as a catalyst for the reaction system. The material of the inert particles 109 will thus depend on the liquid and gas used in the system but could be plastic, for example. The inert particles 109 are preferably spherical and preferably have a diameter of from 1 to 25 mm, more preferably of from 3 to 20 mm and even more preferably of from 5 to 15 mm. For non-spherical particles, each of the particles preferably has a volume corresponding to an equivalent spherical diameter $d_v$ $$\left(i.e.\ d_v = 2\sqrt[3]{\frac{3V}{4\pi}},\ \text{where } V \text{ is the volume of the non-spherical particle}\right).$$

When the vessel 100 is in use, the inert particles 109 are dispersed and move within the vessel to promote mixing between the gas and the liquid and to provide a higher gas-liquid interfacial area for effective mass transfer between the two phases. The movement of the inert particles 109 within the vessel is caused by the gas entering the vessel 100 through the gas inlet 104. The gas is preferably introduced centrally at the base 102 of the vessel 100 to cause the inert particles 109 to move along a circular or elliptical path up and down the vessel 100 while in use.

To assist with the movement of the inert particles 109, the base 102 of the vessel 100 preferably has a conical shape tapering down to the gas inlet 104. This allows the inert particles 109 to slide into the gas feed region at the bottom of the vessel 100 without the formation of dead zones at the bottom of the vessel 100.

The density of the inert particles 109 is preferably similar to that of the liquid so that the inert particles 109 can move more easily throughout the vessel 100 while in use. A density similar to that of the liquid preferably means 15% or less above or below the density of the liquid at the operating temperature of the vessel 100, more preferably 10% or less and even more preferably 5% or less.

Examples

The contactor system described in this invention was evaluated for the capture of $CO_2$ through reactions with ammonium hydroxide. The reaction was carried out through contacting a gas mixture containing 10% $CO_2$ and 90% air with ammonium hydroxide (25% $NH_3$) mixture with saline wastewater, namely desalination reject brine. The water had 7% salinity, which included different ions including sodium, magnesium, and calcium. The reactions were carried out in a jacketed, stainless steel cylindrical vessel with an internal diameter of 78 mm, a height of 700 mm, and a total working volume of 3000 ml. The gas was injected at the bottom of the reactor through a one-hole orifice with a diameter of 3. The liquid was fed via the liquid inlet near the top of the vessel and exited via the effluent passage described above. The inert particles were made from transparent thermoplastic (poly(methyl 2-methylpropenoate)), with an average particle size of 13 mm and a density of 1020 kg/m$^3$.

The $CO_2$ capture and ions (Na, Mg, Ca) removal percentages were optimized by RSM (Response surface methodology) using the Minitab® 17.0 application. As a fitting statistical tool, Minitab® 17.0 offers multilevel factorial screening designs, and numerical optimization can be followed by analyzing the critical factors and their interactions. The design of runs was in accordance with central composite design (CCD). The three major factors, which affect both $CO_2$ capture and ions removal are gas flow rate, temperature and ammonia to NaCl molar ratio; these factors were operated in the range of 0.6 to 2.3 l/min, 13.2 to 46.8° C., and 1.7 to 3.3 $NH_3$:1NaCl for gas flow rate, temperature, and molar ratio, respectively. The other two factors, which only affect $CO_2$ capture, were studied in another CCD. These factors were volume of the inert particles and gauge pressure in the reactor; they were operated in the range of 3 to 17 vol % and 0 to 2.9 bar (0 to 0.29 MPa), respectively. Water samples were withdrawn from the reactor every hour and tested for ions removal using an inductively coupled plasma (ICP) spectrometer. Meanwhile, the effluent gas was continuously passed through a moisture trap then sent to a $CO_2$ gas analyser to detect the $CO_2$ percentage. Variation of the water pH with time was also recorded.

Figure 2:
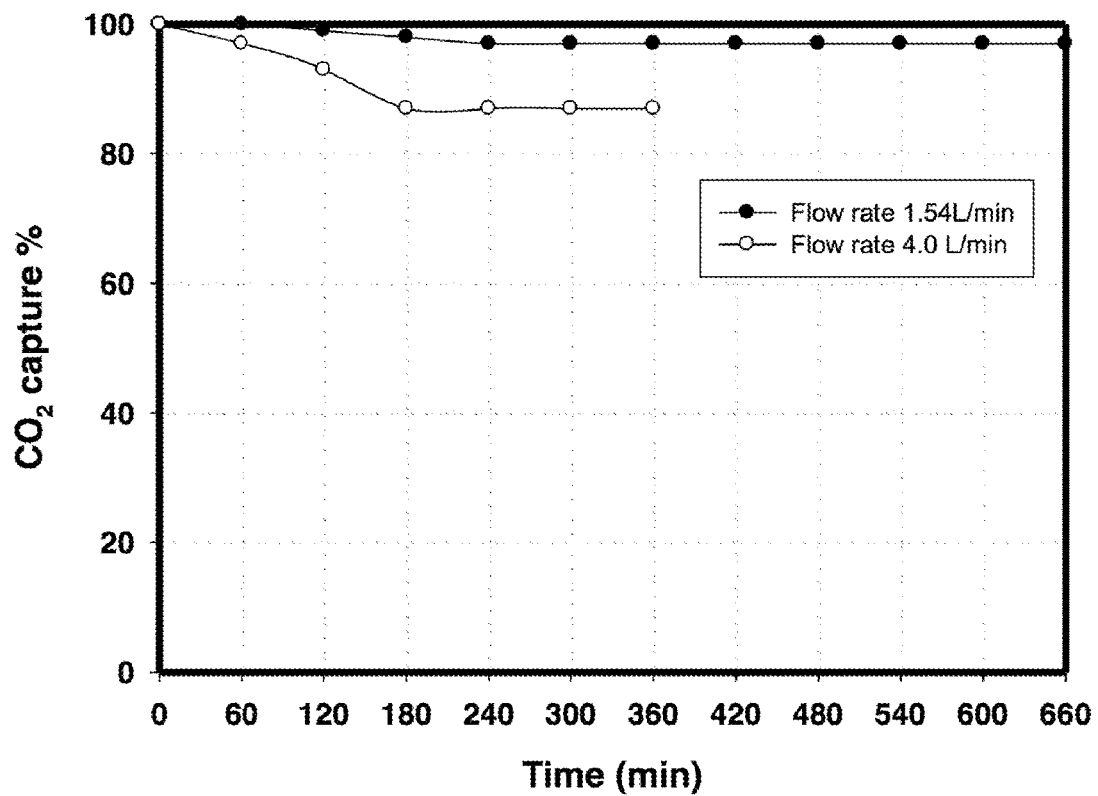
FIG. 2 shows a graph illustrating $CO_2$ capture for different gas flow rates using the system of the present invention.
Figure 3:
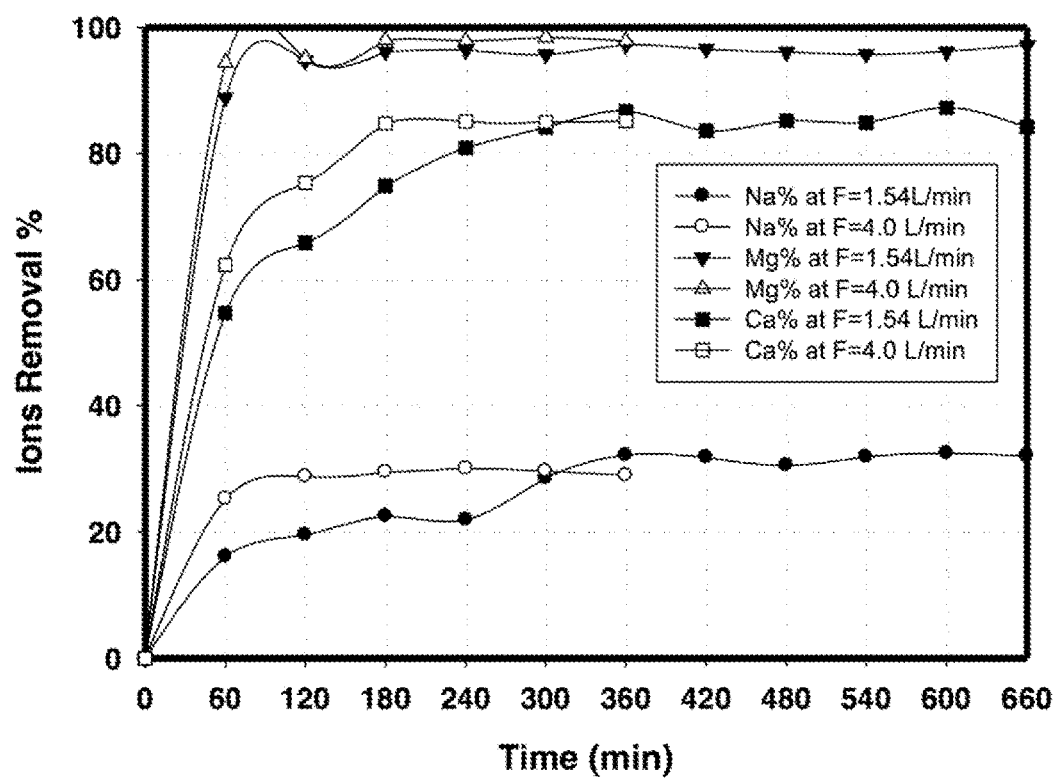
FIG. 3 shows a graph illustrating ion removal for different gas flow rates using the system of the present invention.

Based on the response surface methodology modelling, the optimum operating conditions were found to be a temperature of 19.3±0.5° C.; a gas flow rate of 1 543±2 ml/min; a $NH_3$/NaCl molar ratio of 3.3±0.1; a pressure of 2±0.2 bar gauge (0.2±0.02 MPa gauge); and a total inert particles volume of 6.6±0.1 vol. %. Experiments were carried out at these optimum conditions for two gas flow rates 1 542 ml/min and 4 000 ml/min, at a fixed liquid flow rate of 12.5 ml/min. Both experimental runs were carried out at atmospheric pressure. The experimental results are summarised in Table 1 and plotted in FIGS. 2, 3 and 4 for $CO_2$ capture, ions removal and pH, respectively.

Figure 4:
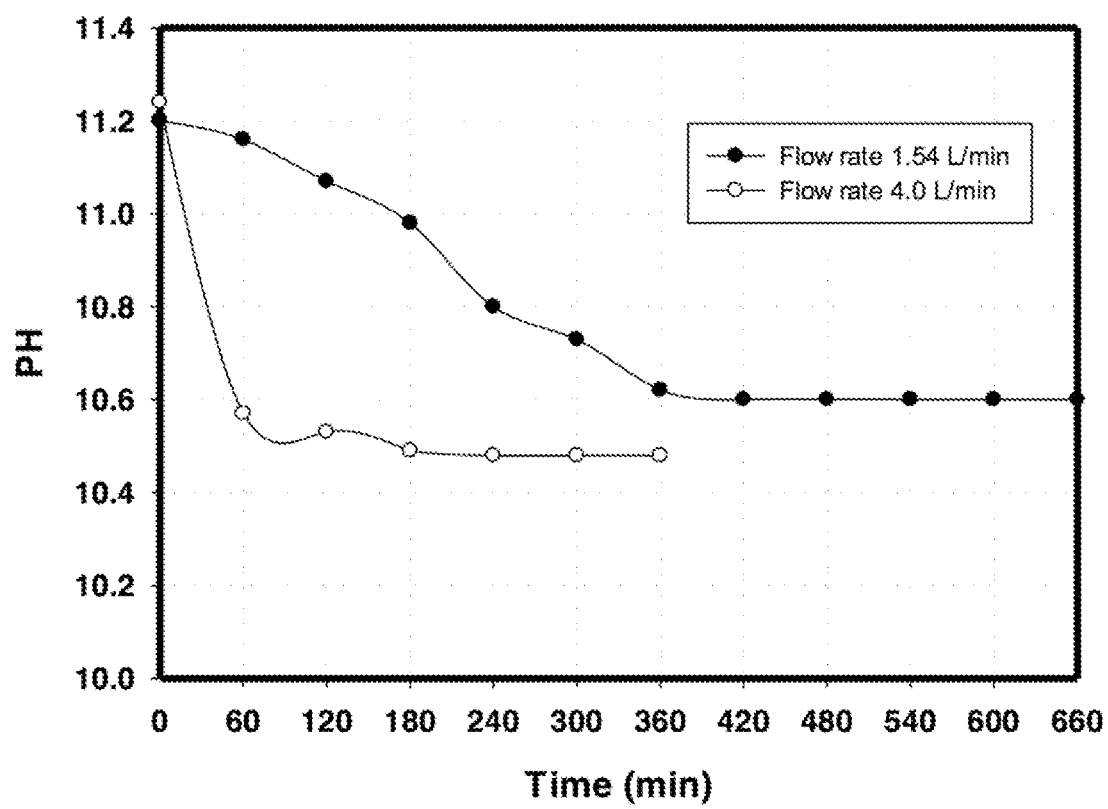
FIG. 4 shows a graph illustrating pH variation with time for different gas flow rates using the system of the present invention.

For the low gas flow rate (1 542 ml/min), the experiment was run for 11 hours, whereas for the other flow rate (4 000 ml/min), the reactor was operated for 5 hours. The experimental results clearly indicate that the reactor system was very stable and reached steady state. The $CO_2$ removal reached steady state after 3 hours for the low gas flow rate and about 4 hours for the high gas flow rate. Similarly, ions removal reached steady state after 3 hours and 6 hours for low and high gas flow rate, respectively. The attainment of steady state seemed to be more evident for the pH level in the reactor as shown in FIG. 4. As expected, the gas residence time inside the reactor seemed to have significant effect on the $CO_2$ capture, but the effect was not as important on the ions removal as shown Table 1. As more gas passes through the reactor system, less $CO_2$ gets captured (about 90%). Nevertheless, the difference between the two cases in $CO_2$ capture efficiency is not substantial given the large difference in gas-to-liquid ratio (G/L). For the low gas flow rate, the gas to liquid ratio (G/L) was 123, and the capture efficiency was 97%, whereas for the higher gas flow rate, the G/L was 320 and the capture efficiency was 90%. These experiments show that the contactor/reactor system of the present invention is very effective in gas-liquid contact/reaction and can achieve a very stable steady state operation.

TABLE 1

| Conditions | Gas flow rate 1 542 ml/min | Gas flow rate 4 l/min |
| --- | --- | --- |
| Temperature | 19.3° C. | 19.3° C. |
| Liquid flow rate | 12.5 ml/min | 12.5 ml/min |
| Inert particles vol % | 6.6 | 6.6 |
| Molar ratio | 3.3 $NH_3$:1NaCl | 3.3 $NH_3$:1NaCl |
| Gas/liquid flow ratio | 123 | 320 |
| $CO_2$ capture efficiency | 97.7% | 90.1% |
| Na removal | 32.5% | 30.0% |
| Mg removal | 97.2% | 98.4% |
| K removal | 49.1% | 37.0% |
| Ca removal | 87.3% | 85.1% |
| Run time | 660 min | 360 min |

Those skilled in the art will recognize that the foregoing description and examples have been presented for the purpose of illustration and example only. Modifications and variations of the present invention are possible in light of the above teaching without departing from the spirit and scope of the invention as defined in the appended claims.

The invention claimed is:

1. A system for contacting gases and liquids, comprising:
a vessel containing inert particles;
a single orifice located at the base of the vessel configured to allow gas to pass into the vessel;
a gas outlet located above the surface of the working volume while in use, configured to allow gas to pass out of the vessel;
a liquid inlet configured to allow liquid to pass into the vessel; and
a liquid outlet configured to allow liquid to leave the vessel;
wherein:
the total volume of the inert particles is from 1 to 20% of the total working volume of the vessel;
the liquid inlet, the liquid outlet, the gas inlet and the gas outlet are arranged such that the liquid passes the gas in counter-current flow through at least a portion of the vessel while in use;
the liquid outlet comprises an effluent passage extending into the vessel;
the inlet of the effluent passage is located below the liquid inlet; and
the liquid leaves the vessel via the effluent passage due to the hydrostatic pressure of the liquid in the vessel while in use.

2. A system according to claim 1, wherein the total volume of the inert particles is from 3 to 15% of the total working volume of the vessel.

3. A system according to claim 1, wherein
the single orifice is located centrally at the base of the vessel such that gas can be introduced centrally into the vessel.

4. A system according to claim 1, further comprising a liquid provided in the vessel, wherein the density of the inert particles is 15% or less above or below the density of the liquid.

5. A system according to claim 1, where the inert particles have a particle size of from 1 mm to 25 mm.

6. A system according to claim 1, wherein the base of the vessel has a conical shape.

7. A system according to claim 1, wherein the introduction of a gas into the vessel causes the inert particles to follow a circular or elliptical path within the vessel, to produce mixing between the gas and the liquid.

\* \* \* \* \*